US008089239B2

(12) United States Patent
Grai et al.

(10) Patent No.: US 8,089,239 B2
(45) Date of Patent: Jan. 3, 2012

(54) ADVANCED METHOD FOR STEPPER MOTOR SPEED DETERMINATION

(75) Inventors: Timothy J. Grai, Oxford, MI (US); Nathan W. John, Flower Mound, TX (US)

(73) Assignee: Renesas Electronics America Inc., Santa Clara, CA (US)

( * ) Notice: Subject to any disclaimer, the term of this patent is extended or adjusted under 35 U.S.C. 154(b) by 369 days.

(21) Appl. No.: 12/148,002

(22) Filed: Apr. 16, 2008

(65) Prior Publication Data

US 2009/0261772 A1 Oct. 22, 2009

(51) Int. Cl.
*H02P 8/00* (2006.01)

(52) U.S. Cl. .......................... 318/696; 318/685; 318/799

(58) Field of Classification Search .................. 318/685, 318/696, 700, 400.01, 799, 280; 324/772, 324/158.1
See application file for complete search history.

(56) References Cited

U.S. PATENT DOCUMENTS 5,032,781 A 7/1991 Kronenberg .................. 318/696
5,287,050 A 2/1994 Kronenberg et al. ......... 318/696
5,313,151 A * 5/1994 Ogden et al. .................. 318/805
5,530,326 A * 6/1996 Galvin et al. ............ 318/400.11
5,783,939 A 7/1998 Lippman et al. .......... 324/154 R
6,208,497 B1 * 3/2001 Seale et al. .................... 361/160
6,519,999 B2 2/2003 Komura et al. ................ 73/1.88
6,624,608 B2 9/2003 Komura ........................ 318/696
6,759,827 B2 * 7/2004 Kawashima .................. 318/727
6,815,923 B2 * 11/2004 Forsey .......................... 318/685
6,861,817 B2 3/2005 Pigott et al. .................. 318/685
7,034,495 B2 4/2006 Sasaki .......................... 318/685
7,129,669 B2 * 10/2006 Mamyoda ..................... 318/685
7,145,309 B2 12/2006 Reiter et al. .................. 318/696
7,239,108 B2 * 7/2007 Best ............................. 318/685
7,288,956 B2 * 10/2007 De Cock et al. ......... 324/765.01
7,453,230 B1 * 11/2008 Kremin ........................ 318/685
2008/0218113 A1 * 9/2008 Cox et al. ...................... 318/490

* cited by examiner

*Primary Examiner* — Walter Benson
*Assistant Examiner* — Antony M Paul
(74) *Attorney, Agent, or Firm* — Campbell Stephenson LLP

(57) ABSTRACT

A method and apparatus for determining speed of a stepper motor. In one embodiment of the method, a first terminal of a first coil of the stepper motor is coupled to an input of a multibit digital-to-analog (A/D) convertor. The stepper motor's a rotor is rotated about an axis while the first terminal is coupled to the multibit A/D convertor. An analog signal is induced at the first terminal generating while the rotor is rotating about the axis. The multibit A/D convertor receives the analog signal induced at the first terminal. The multibit A/D convertor generates a plurality of multibit digital signals in response to receiving the analog signal. The multibit digital signals can be processed to determine the rotational speed at which the rotor was rotating when the A/D convertor generated the plurality of multibit digital signals.

17 Claims, 3 Drawing Sheets

ADVANCED METHOD FOR STEPPER MOTOR SPEED DETERMINATION

BACKGROUND OF THE INVENTION

A stepper motor is a brushless, synchronous electric motor that can divide a full rotation into a large number of steps. Stepper motors are capable of providing rotational positioning with a high degree of accuracy. For these and other reasons, stepper motors have been found to be very suitable for use in automobile dashboard indicators, such as speedometers, tachometers, and the like.

Stepper motors come in many different forms. A typical stepper motor may include at least two coils that are aligned out of phase from one another. For example, a two-phase stepper motor includes first and second coils that are oriented perpendicular to each other. The coils are driven with electrical currents that are suitably out of phase from one another (e.g., 90 degrees for a two-phase, perpendicularly aligned stepper motor). A two-phase stepper motor also includes a rotor with one or more pairs of magnetic poles (e.g., north and south poles). The magnetic poles of the rotor are individually and selectively attracted to magnetic fields created by the first and second coils when they are drien with current.

The typical two-phase stepper motor operates according to a four-phase cycle. In the first phase of the cycle, the first coil is driven by a current of a first polarity, while the second coil is undriven. In the second phase, the second coil is driven by a current of the first polarity, while the first coil is undriven. In the third phase, the first coil is driven by a current with a second, opposite polarity, while the second coil is undriven. In the fourth phase, the second coil is driven by the current with the second, opposite polarity, while the first coil is undriven. In each phase, the stepper motor rotates or steps through a portion of a complete rotation via the interaction of the rotor and the magnetic field created by a driven coil.

By suitably controlling the magnitudes and/or durations of the current provided to the coils, the rotor can be rotated in a desired, controllable manner. When stepper motors are employed in speedometers or tachometers, the timing, magnitude, and/or duration of the current provided to the coils may be related to the physical speed of the vehicle (e.g., miles per hour (mph)) or the revolutions-per-minute (rpm) of the engine, as the case may be, which in turn, be reflected on a gauge by a needle or pointer attached to the rotor via a gear box. When used in speedometers, tachometers, etc., it is important to control the physical position of the gauge pointer so that it accurately indicates the desired measurement (e.g., mph or rpm).

As noted, the current that drives the coils cause the rotor to rotate step by step, each step of which is some portion (e.g., 7 degrees) of a complete revolution of the motor. Stepper motors generally operate open loop, i.e., the electronic circuitry that provide the driving current to the coils has no feedback on where the rotor actually is. In this open loop usage of a stepper motor, the electronic circuitry must assume that steps are taken correctly, which can lead to problems. For example, over time the wear and tear of mechanical and/or electrical components of the stepper motor may cause the motor to slow during step rotation unless the drive current magnitudes and/or durations are adjusted. If the drive current magnitudes and/or durations are not adjusted, the stepper motor may not complete a full step during each phase of the four-phase cycle. For example, the stepper motor may only advance a portion (e.g., 5 degrees) of a full step (e.g., 7 degrees) during phases, thus leading to possible inaccurate positioning of the gauge pointer on the dashboard gauge.

SUMMARY OF THE INVENTION

A method and apparatus for determining speed of a stepper motor. In one embodiment of the method, a first terminal of a first coil of the stepper motor is coupled to an input of a multibit digital-to-analog (A/D) convertor. The stepper motor's a rotor is rotated about an axis while the first terminal is coupled to the multibit A/D convertor. An analog signal is induced at the first terminal generating while the rotor is rotating about the axis. The multibit A/D convertor receives the analog signal induced at the first terminal. The multibit A/D convertor generates a plurality of multibit digital signals in response to receiving the analog signal. The multibit digital signals can be processed to determine the rotational speed at which the rotor was rotating when the A/D convertor generated the plurality of multibit digital signals.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

The present invention provides an apparatus and method for measuring the rotational speed of a stepper motor. The measured rotational speed can be used for many purposes. The measured rotational speed can be used to monitor the health of the stepper motor and provide advance notice when the stepper motor starts to fail. The measured rotational speed provides the ability to minimize the amount of current consumed by the stepper motor in those systems (e.g., computer disk drives) where power consumption and/or EMI is important. The measured rotational speed provides the ability to characterize individual motor specifications, and fine tune the signals that are created by the drive control circuitry to optimally operate that particular motor. With the ability to measure rotational speed, stepper motors can be produced with less tightly controlled tolerances (cheaper motors) because the characteristics of the motor could be calibrated during final testing, instead of being guaranteed by the motor manufacturer. The present invention will be described with reference to a two-phase stepper motor, it being understood that the present invention should not be limited thereto. Moreover, the present invention will be described with reference to a stepper motor which controls the position of a gauge pointer such as those employed in automobile dashboards, it being understood that the present invention should not be limited thereto.

Figure 1:
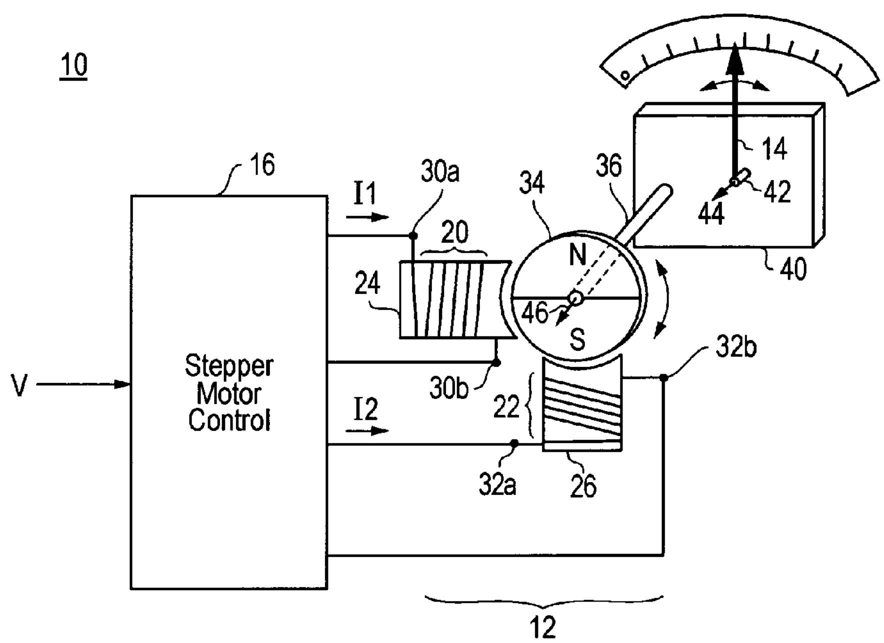
FIG. 1 illustrates relevant components of a system employing one embodiment of the present invention.

FIG. 1 illustrates relevant components of a system 10 employing an example embodiment of the present invention. System 10 includes of a stepper motor 12 mechanically coupled to a gauge pointer 14 and electrically coupled to a stepper motor control 16. Stepper motor 12 includes coils 20 and 22 that are perpendicularly oriented with respect to each other. Coils 20 and 22 should be substantially the same in structure (e.g., having the same number of turns, etc.) so that they produce substantially the same magnetic fields when driven with the same electrical current. Coil 20 is wrapped around core 24 and electrically coupled between terminals 30*a* and 30*b*. Coil 22 is wrapped around core 26 and electrically coupled between terminals 32*a* and 32*b*.

Stepper motor 12 also includes a rotor 34 having a pair of poles (i.e., a north pole N and a south pole S). In one embodiment, rotor 34 takes form in a two-pole permanent magnet. Rotor 34 is mechanically coupled to gauge pointer 14 via rotatable shaft 36, gear box 40, and rotatable arm 42. Gauge pointer 14 rotates about an axis 44 defined by rotatable arm 42. Rotor 34 rotates about axis 46 defined by shaft 36. Although not shown, gear box 40 includes gears that mechanically couple shaft 36 and arm 42. The gear ratio provided by the gears in one embodiment may range anywhere from 2:1 to 180:1. The rotation of gauge pointer 14 is proportional to the rotation of rotor 34. With a gear ratio of 180:1, for example, 360 degrees of rotor rotation or 32 microsteps may correspond to two degrees of gauge pointer 14 rotation.

Terminals 30*a* and 30*b* are electrically coupled to stepper motor control 16. Likewise, terminals 32*a* and 32*b* are electrically coupled to control 16. Control 16 may take form in one or more electrical circuits. Some or all of the circuits may be formed on one or more substrates. When circuits of control 16 are formed on multiple substrates, the substrates can be mounted on a printed circuit board and coupled together via traces on the printed circuit board.

Stepper motor control 16 is configured to receive a signal V that represents a measured value (rpm, mph, etc.). Although not shown, control 16 may receive additional signals that are needed for proper operation of stepper motor 12. In response to receiving a change in V, control 16 generates drive currents I1 and I2 of a four-phase cycle as will be more fully described below. Drive currents I1 and I2 create magnetic fields in coils 20 and 22, respectively, which in turn causes rotational movement of a rotor 34 and gauge pointer 14.

Figure 2:
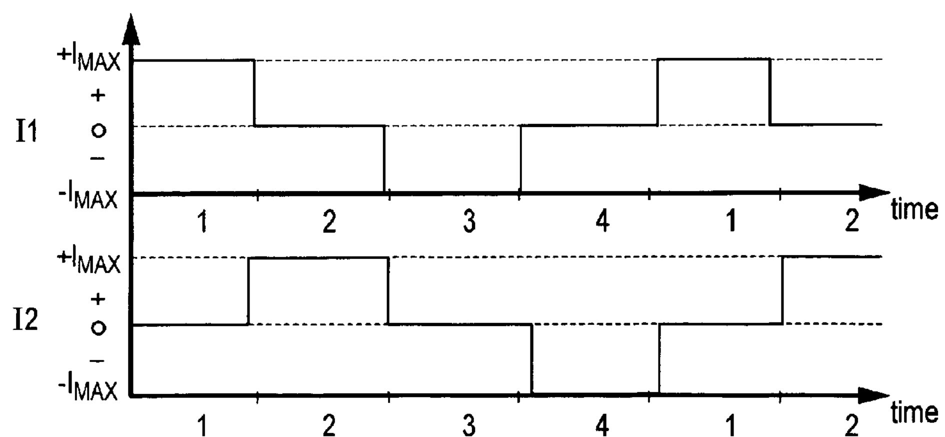
FIG. 2 illustrates a timing diagram of a four-phase cycle for controlling the stepper motor of FIG. 1.

FIG. 2 illustrates the timing and polarity of a four-phase cycle for controlling stepper motor 12. In the first phase of the cycle, control 16 drives coil 20 with current I1 having magnitude +Imax, while coil 22 remains undriven by control 16. In the second phase or step, control 16 drives coil 22 with current I2 having a magnitude of +Imax, while coil 20 remains undriven by control 16. In the third phase or step, control 16 drives coil 20 with I1 having a magnitude of −Imax, while coil 22 remains undriven by control 16. In the fourth and last phase or step, control 16 drives coil 22 with I2 having a −Imax magnitude, while coil 20 remains undriven by control 16. In each phase shown in FIG. 2, rotor 34 should step or rotate the same angular amount (e.g., 5 degrees). It is well known that by choosing the appropriate magnitudes and/or durations of I1 and I2 during each phase, half stepping or even microstepping can be achieved. Moreover, by controlling the magnitude and sequencing of drive currents I1 and I2 during each phase, rotor 34 can be made to rotate either in a forward (clockwise) or reverse direction. One of ordinary skill understands that when rotor 34 rotates, rotor 34 induces a voltage in the coil that is undriven by control 16.

Initially the magnitude and/or duration of currents I1 and I2 may be generated by control 16 such that coils 20 and 22 are driven with just enough current to rotate rotor 34 by a desired amount (e.g., 5 degrees) during each phase of the four-phase cycle shown, for example, in FIG. 2. However, as noted above, components of the system 10 may be subject to wear and tear over time. For example, mechanical friction may increase between shaft 36 and components in gear box 40, which in turn may slow the rotational speed of rotor 34 during the phases shown in FIG. 2. As a result, rotor 34 over time may not rotate the full, desired angular amount (e.g., 5 degrees) during each phase, thus resulting in a possible inaccurate representation of variable V by gauge pointer 14. To compensate for wear and tear over time, control 16 can adjust the magnitude and/or duration of currents I1 and I2 that drive coils 20 and 22 during each phase so that rotor 34 once again rotates the full, desired angular amount during each phase. Obviously, before adjustments can be made in this situation, it is important to know the speed of rotor 34 during operation.

While rotor 34 rotates, control 16 is capable of calculating the speed of rotation using the analog voltage that is induced at terminal 30*b* or 32*b* of undriven coil 20 or 22, respectively. In this regard, stepper motor control 16 receives the analog voltage induced at a terminal of undriven coil 20 or 22. Control 16 converts the received, induced analog signal into corresponding multibit digital signals. In one embodiment, the induced analog signal is sampled 10-100 times during one or more phases in order to generate respective multibit digital signal representations thereof. Control 16 can process these multibit digital signals in accordance with instructions stored within memory (not shown) to generate one or more values that represent the rotational speed of rotor 34. Control 16 can compare one or more of the generated rotational speed values for rotor 34 with predetermined rotational speed values. If the generated and predetermined rotational speed values do not compare equally, control 16 can adjust Imax and/or the duration of the phases shown in FIG. 2 until subsequently generated rotational speed values compare equally to the predetermined rotational speed value. In this manner stepper motor 12 can be adjusted to compensate for mechanical or electrical wear and tear.

Figure 3:
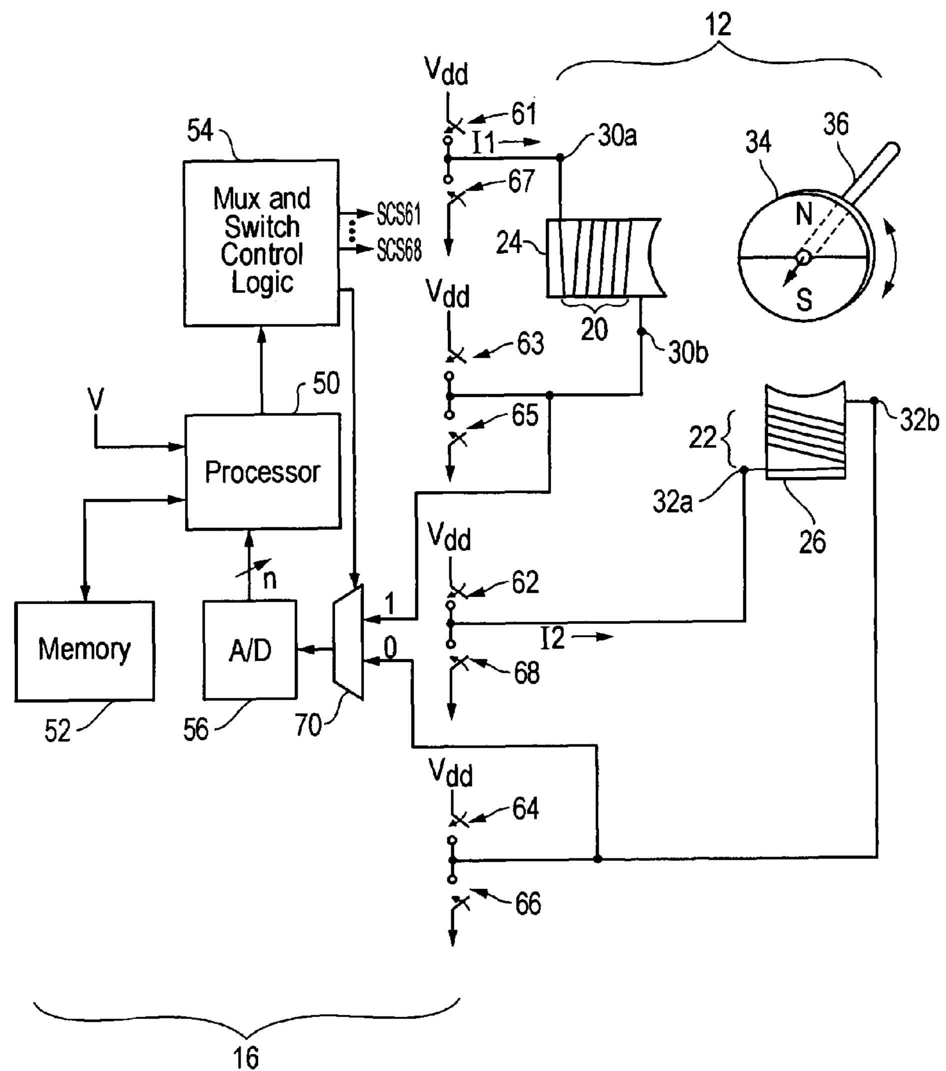
FIG. 3 illustrates relevant components of the exemplary stepper control motor of FIG. 1.

FIG. 3 illustrates in block diagram form, relevant components of control 16. It should be noted that control 16 shown in FIG. 3 is one embodiment of an apparatus that can control rotational speed of rotor 34 and that can measure the rotational speed and/or direction of rotor 34 (in addition to performing other functions), it being understood that other embodiments of control 16 are contemplated. Control 16 is electrically coupled to terminals 30*a* and 30*b* and to terminals 32*a* and 32*b*. Control 16 includes a processor 50 configured to process multibit digital signals, including multibit digital signals that represent analog voltages that are induced at terminals 30*b* and 32*b*. Processor 50 processes multibit digital signals in accordance with instructions stored in memory (not shown). Processor 50 is also configured to receive and process signal V from an external source in accordance with instructions stored in memory. Processor 50 is coupled to memory 52, switch control logic 54, multibit analog-to-digital (A/D) converter 56, and multiplexer 70. Processor 50 can generate or calculate values (e.g., rotational speed values) for subsequent storage in memory 52. Moreover, processor 50 is capable of processing multibit digital signals stored in memory 52 to generate values (e.g., rotational speed values) in accordance with one or more algorithms. Processor 50 is configured to receive and process multibit digital signals from A/D converter 56, as will be more fully described below.

Control logic 54 generates switch control signals SCS61-SCS68 for controlling switches 61-68, respectively, in order to implement the four-phase cycling shown in FIG. 2. Additionally, control logic 54 is coupled to and controls multiplexer 70. The output of multiplexer 70 is coupled to an input of A/D converter 56. Inputs to multiplexer 70 are coupled to terminals 30*b* and 32*b* of stepper motor 12 as shown. As will be more fully described below, analog voltages induced by undriven coils 20 and 22 are multiplexed to the input of A/D converter 56 via multiplexer 70. Control logic 54 controls multiplexer 70 such that terminals 30*b* and 32*b* are selectively coupled to A/D converter 56. A/D converter 56 generates n-bit digital signals, where n>2 (e.g., n is 8-16 bits), which are representative of the analog voltage signals induced at terminals 30*b* and 32*b*. The multibit digital signals, in turn, are provided to processor 50 for subsequent processing and/or storage within memory 52 in accordance with instructions executing on processor 50.

As noted above, control 16 alternatively drives coils 20 and 22 with currents I1 and I2, respectively, during the four-phase cycle of FIG. 2. By closing switches 61 and 65 and opening switches 63 and 67 during the first phase, control 16 drives coil 20 with I1 equal to +Imax. Control 16 drives coil 22 with I2 equal to +Imax during the second phase by closing switches 62 and 66 and opening switches 64 and 68. Control 16 drives coil 20 with I1 equal to −Imax during the third phase by closing switches 63 and 67 and opening switches 61 and 65. Control 16 drives coil 22 with I2 equal to −Imax during the fourth phase by closing switches 64 and 68 and opening switches 62 and 66. It is noted that when coil 20 is being driven, multiplexer 70 couples terminal 32*b* to the input of A/D converter 56 in accordance with a control signal that is received from control logic 54. When coil 22 is being driven with current I2, terminal 30*b* is coupled to A/D converter 56 via multiplexer 70. If rotor 34 is rotating, a voltage will be induced at the terminal (i.e. terminal 30*b* or 32*b*) of the undriven coil that is coupled to multiplexer 70. A/D convertor 56 samples the induced analog voltage and generates corresponding multibit signals for subsequent processing by processor 50. It is noted that currents I1 and 12 are provided to coils 20 and 22 by opening and closing switches (e.g., switches 61 and 62) that are coupled to voltage source Vdd. In an alternative embodiment, currents I1 and 12 can be provided to coils 20 and 22 by drivers (e.g., current drivers) that are controlled by, for example, control logic 54 to provide the timing and polarity of FIG. 2. In still another embodiment, respective drivers coupled to coils 20 and 22 via switches 61 and 62, respectively, may provide currents I1 and I2.

Figure 4:
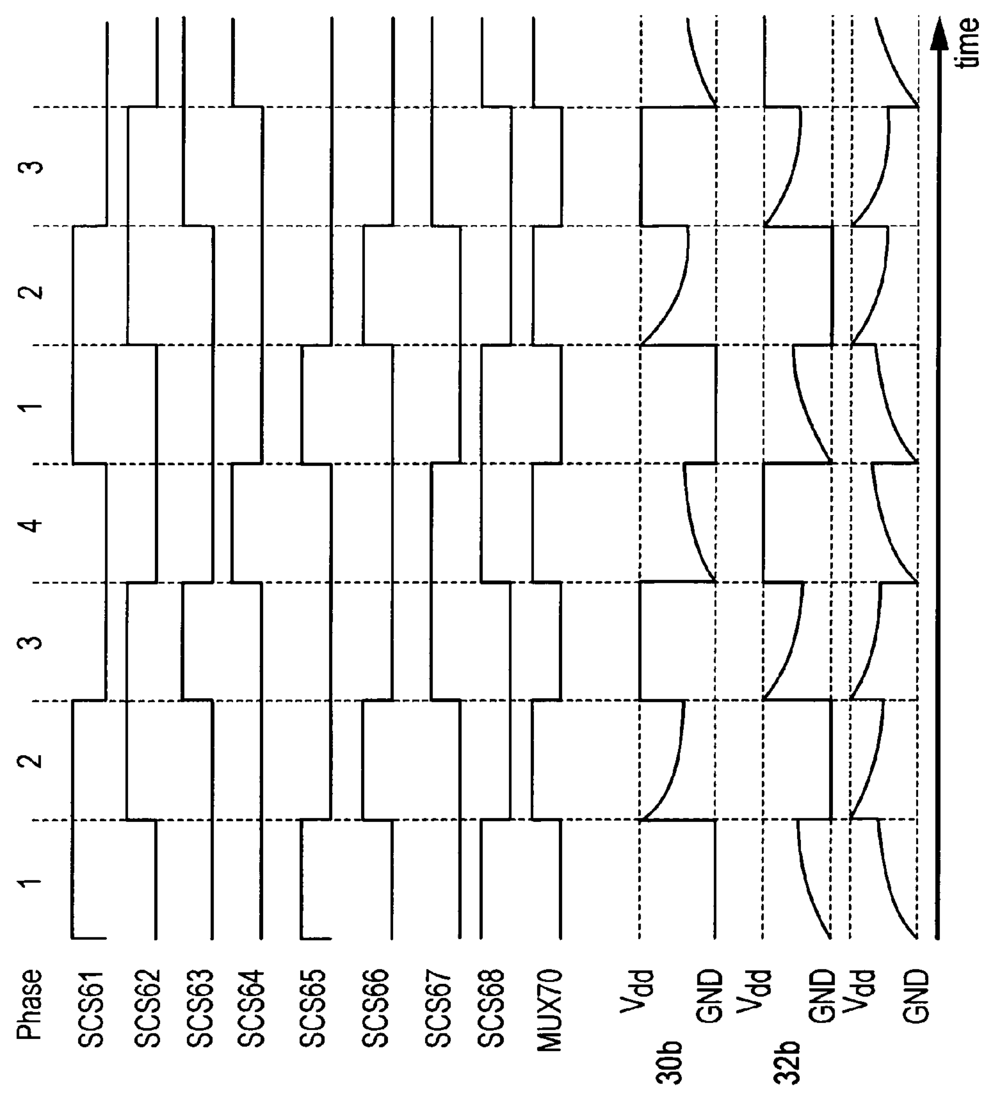
FIG. 4 illustrates a timing diagram for controlling the switches and multiplexer of stepper motor of FIG. 3, in addition to illustrating exemplary induced analog voltages.

FIG. 4 illustrates exemplary timing signals generated by control logic 54 for controlling switches 61-68 and multiplexer 70 during the four-phase cycle that was described above. FIG. 4 also illustrates example voltages that are induced at terminals 30*b* and 32*b* by the rotational movement of rotor 34. Lastly, FIG. 4 illustrates the analog voltage that is input to A/D converter 56 via multiplexer 70.

With continuing reference to FIGS. 3 and 4, during the first phase, switches 61, 65 and 68 are closed in accordance with respective control signals generated by control logic 54 while the other switches are opened. Control logic 54 also couples terminal 32*b* to the input of A/D converter 56 via multiplexer 70. With rotor 34 moving during the first phase, an analog voltage is induced at terminal 32*b* as shown in FIG. 4. This analog voltage varies with time during the first phase. A/D converter 56 samples the induced analog voltage and generates several corresponding multibit digital values, which may be subsequently provided to processor 50. The multibit digital values may be stored in memory 52 for future processing by processor 50. Alternatively, processor 50 may process the several multibit digital signals as they are received from A/D converter 56. Either way, processor 50 can process the generated multibit digital signals to calculate the speed at which rotor 34 is rotating during the first phase.

During the second phase, switches 62, 66 and 61 are closed in accordance with respective control signals generated by control logic 54 while the other switches are opened. Here, coil 22 is being driven with +Imax current. Control logic 54 also couples terminal 30*b* to the input of A/D converter 56 via multiplexer 70. With rotor 34 moving during the second phase, an analog voltage is induced at terminal 30*b* as shown in FIG. 4. This analog voltage varies with time during the second phase. A/D converter 56 samples the induced analog voltage and generates several corresponding multibit digital values, which may be subsequently provided to processor 50. The multibit digital values may be stored in memory 52 for future processing by processor 50. Alternatively, processor 50 may process the several multibit digital signals as they are received from A/D converter 56. Either way, processor 50 can process the generated multibit digital signals to calculate the speed at which rotor 34 is rotating during the second phase.

In the third phase, switches 63, 67 and 62 are closed in accordance with respective control signals generated by control logic 54 while the other switches are opened. Here, coil 20 is being driven with −Imax current. Control logic 54 also couples terminal 32*b* to the input of A/D converter 56 via multiplexer 70. With rotor 34 moving during the second phase, an analog voltage is induced at terminal 32*b* as shown in FIG. 4. This analog voltage varies with time during the third phase. A/D converter 56 samples the induced analog voltage and generates several corresponding multibit digital values, which may be subsequently provided to processor 50. The multibit digital values may be stored in memory 52 for future processing by processor 50. Alternatively, processor 50 may process the several multibit digital signals as they are received from A/D converter 56. Either way, processor 50 can process the generated multibit digital signals to calculate the speed at which rotor 34 is rotating during the third phase.

During the fourth and final stage of the four-phase cycle, switches 64, 68 and 67 are closed in accordance with respective control signals generated by control logic 54 while the other switches are opened. Here, coil 22 is being driven with −Imax current. Control logic 54 also couples terminal 30*b* to the input of A/D converter 56 via multiplexer 70. With rotor 34 moving during the fourth phase, an analog voltage is induced at terminal 30*b* as shown in FIG. 4. This analog voltage varies with time during the fourth phase. A/D converter 56 samples the induced analog voltage and generates several corresponding multibit digital values, which may be subsequently provided to processor 50. The multibit digital values may be stored in memory 52 for future processing by processor 50. Alternatively, processor 50 may process the several multibit digital signals as they are received from A/D converter 56. Either way, processor 50 can process the generated multibit digital signals to calculate the speed at which rotor 34 is rotating during the fourth phase.

As noted that the multibit digital signals generated by A/D converter 56 can be immediately processed by processor 50 or stored within memory 52 for subsequent processing. In either embodiment, processor 50 can process the multibit digital signals that were genererated during any phase to determine rotational speed of rotor 34 during that phase. In one embodiment, the rotational speed is calculated as a function of the rate of change of consecutive multibit digital signal representations of the induced analog voltage during a phase. In another embodiment, the rotational speed is calculated by comparing the multibit digital signals that were generated during a phase to respective multibit digital signals of a group stored in memory 52 that is mapped to a known rotational speed. If the multibit digital signals generated during the phase substantially match the respective multibit digital signals of the group, then the speed of the rotor is presumed to be the speed that is mapped to the group. If not, additional groups of multibit digital signals stored in memory 52 and mapped to respective known rotational speeds, are compared with the multibit digital signals generated during the phase until a match is determined. It is noted that the algorithm used by processor 50 to calculate rotational speed as a function of multibit digital signals that were generated during the first phase may be different than the algorithm used by processor 50 to calculate rotational speed as a function of multibit digital signals that were generated during the second phase.

The rotational speed calculated by processor 50 can be compared with a previously determined rotational speed of rotor 34, which may be stored in memory 52. If the speeds are not substantially equal, processor 50 can instruct control logic 54 to adjust the magnitude of Imax and/or the duration of the four phases so that subsequent calculations of rotational speed of rotor 34, which are based on multibit digital samples of the induced analog voltages, equal the previously determined rotational speed. In one embodiment, control logic 54 can adjust Imax by adjusting (i.e., increasing or decreasing) the magnitude of Vdd. Other methods of adjusting Imax are contemplated.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus comprising;
- a first coil electrically coupled between first and second terminals;
- a multibit analog-to-digital (A/D) converter for generating multibit digital signals;
- a circuit comprising an input for receiving a control signal, wherein the circuit is configured to selectively couple the second terminal to an input of the multibit A/D converter in accordance with the control signal;
- a rotor that is configured to rotate about an axis;
- a processor configured to generate a value in response to processing multibit digital signals generated by the A/D convertor while the rotor is rotating about the axis, wherein the value relates to a non-zero rotational speed of the rotor about the axis;
- wherein the processor is further configured to generate an instruction for adjusting the magnitude of current provided to the first coil in response generating the value.

2. The apparatus of claim 1 further comprising a memory configured to store multibit digital signals that are generated by the A/D convertor.

3. The apparatus of claim 1:
- wherein the processor is configured to compare the value with another value;
- wherein the processor is configured to generate the instruction in response to comparing the value with the other value;
- wherein the instruction is a first instruction to increase for increasing the magnitude of current provided to the first coil in response if the value is less than the other value;
- wherein the instruction is a second instruction for decreasing the magnitude of current provided to the first coil in response if the value is greater than the other value.

4. The apparatus of claim 3 wherein the other value relates to a non-zero rotational speed of the rotor about the axis that was previously generated by the processor.

5. The apparatus of claim 1 further comprising:
- a second coil electrically coupled between first and second terminals;
- wherein the circuit is configured to selectively couple the second terminal of the second coil to the input of the A/D convertor.

6. The apparatus of claim 1 wherein the rotor comprises a magnet; and wherein the rotor induces a change in voltage between the first and second terminals as the rotor rotates about the axis.

7. The apparatus of claim 1 wherein the circuit comprises a multiplexor.

8. An apparatus comprising;
- a first coil electrically coupled between first and second terminals;
- a multibit analog-to-digital (A/D) converter for generating multibit digital signals;
- a circuit comprising an input for receiving a control signal, wherein the circuit is configured to selectively couple the second terminal to an input of the multibit A/D converter in accordance with the control signal;
- a rotor that is configured to rotate about an axis;
- a processor configured to generate a value in response to processing multibit digital signals generated by the A/D convertor while the rotor is rotating about the axis;
- wherein the processor is further configured to generate an instruction for adjusting the magnitude of current provided to the first coil in response generating the value;
- wherein the value relates to a non-zero rotational acceleration of the rotor about the axis.

9. A method comprising:
- a circuit receiving a first control signal;
- in response to receiving the first control signal, the circuit coupling a first terminal of a first coil to an input of a multibit analog-to-digital (A/D) convertor;
- rotating a rotor about an axis while the first terminal is coupled to the multibit A/D convertor;
- the first terminal generating an analog signal while the rotor is rotating about the axis;
- the multibit A/D convertor receiving the analog signal from the first terminal;
- the multibit A/D convertor generating multibit digital signals in response to receiving the analog signal from the first terminal;
- a processor receiving and processing the multibit digital signals to generate a value that relates to a non-zero rotational speed of the rotor about the axis;
- the processor generating an instruction for adjusting the magnitude of current provided to the first coil in response to generating the value.

10. The method of claim 9 further comprising:
- an act of comparing the value with another value;
- wherein the processor generates the instruction in response to comparing the value with another value;
- wherein the instruction is a first instruction to increase for increasing the magnitude of current provided to the first coil in response if the value is less than the other value;
- wherein the instruction is a second instruction for decreasing the magnitude of current provided to the first coil in response if the value is greater than the other value.

11. The method of claim 10 wherein the other value relates to a non-zero rotational speed of the rotor about the axis that was previously generated by the processor.

12. The method of claim 9 further comprising:
- the circuit receiving a second control signal,
- in response to receiving the second control signal, the circuit decoupling the first terminal of the first coil from the input of the multibit A/D convertor;

coupling a first terminal of a second coil to the input of the multibit A/D convertor;

rotating the rotor of about the axis while the first terminal of the second coil is coupled to the multibit A/D convertor;

the first terminal of the second coil generating an analog signal while the rotor is rotating about the axis;

the multibit A/D convertor receiving the analog signal from the first terminal of the second coil;

the multibit A/D convertor generating a plurality of multibit digital signals in response to receiving the analog signal from the first terminal of the second coil.

13. The method of claim 9 wherein a second terminal of the first coil is coupled to a positive voltage source while the first terminal is coupled to the input of the multibit A/D convertor and while the first terminal is generating the analog signal.

14. The method of claim 9 further comprising inducing a change in voltage between the first and second terminals while the first terminal is coupled to the input of the multibit A/D convertor.

15. A method comprising:

a circuit receiving a first control signal;

in response to receiving the first control signal, the circuit coupling a first terminal of a first coil to an input of a multibit analog-to-digital (A/D) convertor;

rotating a rotor about an axis while the first terminal is coupled to the multibit A/D convertor;

the first terminal generating an analog signal while the rotor is rotating about the axis;

the multibit A/D convertor receiving the analog signal from the first terminal;

the multibit A/D convertor generating multibit digital signals in response to receiving the analog signal from the first terminal;

a processor receiving and processing the multibit digital signals to generate a value;

the processor generating an instruction for adjusting the magnitude of current provided to the first coil in response to generating the value;

wherein the value relates to a rotational acceleration of the rotor about the axis.

16. An apparatus comprising:

means for inducing a change in voltage between first and second terminals of a coil;

means for converting an analog signal into multibit digital signals;

means for selectively coupling the first or second terminal to an input of the means for converting, in accordance with a control signal;

a rotor that is configured to rotate about an axis;

means for generating a value in response to processing the multibit digital signals, wherein the value relates to a non-zero rotational speed of the rotor about the axis.

17. The apparatus of claim 1 further comprising a means for selectively coupling a terminal of a second coil to the means for converting.

* * * * *